US005670010A

United States Patent [19]

Hagiwara et al.

[11] Patent Number: 5,670,010

[45] Date of Patent: Sep. 23, 1997

[54] PROCESS FOR ADHERING A FLUORORESIN FILM TO A METAL SURFACE USING A PRIMER

[75] Inventors: Minori Hagiwara; Kenji Kiwa, both of Yokohama; Tatsuya Ogita, Tokyo; Luc Germain Pierre Joseph D'Haenens, Yokohama, all of Japan

[73] Assignee: E. I. Du Pont de Nemours and Company, Wilmington, Del.

[21] Appl. No.: 508,510

[22] Filed: Jul. 28, 1995

Related U.S. Application Data

[63] Continuation-in-part of Ser. No. 182,633, Jan. 26, 1994, abandoned.

[51] Int. Cl.$^6$ .......... C09J 4/00

[52] U.S. Cl. .......... 156/330.9; 156/331.5; 428/419; 524/441; 525/180

[58] Field of Search .......... 428/419; 156/330.9, 156/331.5; 525/180; 524/441

[56] References Cited

U.S. PATENT DOCUMENTS

| | | | |
|---|---|---|---|
| 3,993,843 | 11/1976 | Vasta . | |
| 4,021,395 | 5/1977 | Vary . | |
| 4,051,096 | 9/1977 | Koseki et al. . | |
| 4,139,576 | 2/1979 | Yoshimura et al. | 525/180 |
| 4,183,838 | 1/1980 | Gagliani . | |
| 4,287,112 | 9/1981 | Berghmans | 524/441 |
| 4,321,174 | 3/1982 | Hoy et al. . | |
| 4,425,467 | 1/1984 | Alvino et al. . | |
| 4,490,499 | 12/1984 | Huybrechts . | |
| 4,503,168 | 3/1985 | Hartsing, Jr. . | |
| 4,533,685 | 8/1985 | Hudgin et al. . | |
| 4,566,990 | 1/1986 | Liu et al. . | |
| 4,599,383 | 7/1986 | Satoji . | |
| 4,755,556 | 7/1988 | Harris et al. . | |
| 4,795,777 | 1/1989 | Higginbotham et al. . | |
| 4,898,905 | 2/1990 | Kawakami et al. . | |
| 5,039,572 | 8/1991 | Bobsein et al. . | |
| 5,041,335 | 8/1991 | Inai et al. | 428/419 |
| 5,045,114 | 9/1991 | Bigalk et al. . | |
| 5,168,013 | 12/1992 | Tannenbaum . | |
| 5,168,107 | 12/1992 | Tannenbaum . | |
| 5,204,400 | 4/1993 | Kelly et al. . | |
| 5,258,441 | 11/1993 | Nagahiro et al. . | |
| 5,268,409 | 12/1993 | Asai et al. . | |
| 5,304,422 | 4/1994 | Tanabe et al. . | |

FOREIGN PATENT DOCUMENTS

| | | |
|---|---|---|
| 0 343 015 | 11/1989 | European Pat. Off. . |
| 0 389 966 | 10/1990 | European Pat. Off. . |
| WO91/02773 | 3/1991 | WIPO . |
| WO92/10309 | 6/1992 | WIPO . |

*Primary Examiner*—John J. Gallagher

[57] ABSTRACT

A process for adhering a fluororesin film to a metal surface, using a primer comprising fluororesin, aluminum flake and more polyether sulfone than polyamideimides.

2 Claims, No Drawings

PROCESS FOR ADHERING A FLUORORESIN FILM TO A METAL SURFACE USING A PRIMER

CROSS REFERENCE TO RELATED APPLICATION

This application is a continuation-in-part of application Ser. No. 08/182,633 filed Jan. 26, 1994, now abandoned.

BACKGROUND OF THE INVENTION

The present invention relates to a primer composition for adhering a fluororesin coating onto a metal surface, and a method for coating a metal surface with a fluororesin, using the primer composition.

Because of its excellent properties in chemical resistance, heat resistance, non-stickiness, and the like, fluororesins are used as preferred coating materials for metal surfaces, for example, in applications which include linings for chemical units, which are required to be corrosion resistant: linings for rice cookers, and cooking utensils that are required to be corrosion resistant and non-sticky. However, the excellent non-stickiness results in insufficient adhesion to the metal surface, and a variety of methods have been used up to now for improving the adhesion to metal surfaces.

When coating a metal surface with a fluororesin, powder coating is normally carried out for coating the fluororesin, in that a thicker application can be made compared to that of a fluororesin coating made by spray coating, so as to give good corrosion resistance and excellent non-stickiness to the coated surface, as well as providing resistance to the formation of pinholes reaching as deep as the substrate; however, this approach still does not solve the problem of resistance to sticking to the substrate due to the non-stickiness which characterizes the fluororesin, so that powder coating of the metal surface with a fluororesin calls for using, in addition to an inorganic acid primer, a primer for the fluororesin powder coating containing organic adhesives, such as polyamideimides, polyimides, polyether sulfones, epoxy resins, and the like, followed by powder coating a fluororesin. However, none of these processes provides optimum adhesion and corrosion resistance when used for a primer for a fluororesin powder coating. That is, a thick powder coating application results in a coated film with a large internal stress resulting in the deficiencies of cohesive failure of the primer and a layer-layer delamination between the primer and top coat (powder coating), problems which remain unsolved.

Thermoplastic fluororesins which are film-forming fluororesins, such as tetrafluoroethylene/perfluoroalkyl vinyl ether copolymers (PFA), tetrafluoroethylene/hexafluoropropylene copolymers (FEP), and the like, are capable of exhibiting fluidity at or above their melting points and of adhering to metals with an adhesion strength too weak to be of any practical use. Thus, the conventional approach has been to chemically or physically roughen the metal surface, followed by a thermal fusion or adhering with the intermediary of an adhesive or primer between the fluororesin film and the metal. These procedures, while exhibiting satisfactory initial adhesion strength, have had low heat resistance making it difficult to maintain adhesion strength in service above 200° C., due to the thermal degradation and thermal decomposition of the adhesive itself or decay of the anchoring effect. Thus, it has been difficult to adhere a fluororesin film to metal, and if any adhesion was provided at all, it was of a weak adhesion strength or had undesirable heat resistance.

Primers used as such adhesives have contained such materials as polyamideimides (PAI), polyimides (PI), polyphenylene sulfones (PPS), polyether sulfones (PES), and mica, such as in EP 343015—Sumitomo Electric, and Japanese Kokai 58(83)-19702. However, none of the prior art seems to have found the best proportions of the right ingredients for optimum primer to be used with PFA powder coats or film laminating.

The coating of a metal surface, especially for cookware, with a fluororesin by powder coating the metal surface with a fluororesin or adhering a fluororesin film to the metal surface requires assuring secure adhered surfaces without treating the metal surface with an chromic acid or similar inorganic acids that raise toxicity questions. Also needed, is improved adhesion between the metal surface and the fluororesin, good heat resistance, corrosion resistance, and durability.

SUMMARY OF THE INVENTION

The present invention provides a process for adhering a thermoplastic fluororesin film to a metal surface comprising applying to the metal surface a primer composition of a solution or a dispersion in an organic solvent, of a polyether sulfone, at least one polymer selected from the group consisting of a polyamideimide, and a polyimide, plus a fluororesin, and a particulate aluminum metal or alloy, in which the proportion of the polyether sulfone to one or both of polyamideimide and polyimide is from 55:45 to 95:5 and the ratio of the total polyether sulfone to one or both of polyamideimide and polyimide to the fluororesin is 20:80 to 70:30 by weight, and in which the particulate aluminum metal or alloy is in the form of flake and is present in an amount of 1–15% based on the solids of the composition by weight and applying onto said layer a thermoplastic fluororesin film by hot melt adhesion.

DETAILED DESCRIPTION

Extensive studies by the present inventors in order to solve the above problems have led to the finding that adhesion to a metal surface can be considerably improved, and a fluororesin coating having excellent heat resistance and durability can be provided as well, by the generation of a primer-applied layer on the metal surface using for a primer composition a fluororesin coating comprising a solution or a dispersion in organic solvent of a polyether sulfone, polyamideimide and/or polyimide, a fluororesin, and a metal powder, followed by powder coating a fluororesin, or else sintering the primer and hot-melting a thermoplastic fluororesin film. This finding has led to the completion of this invention.

That is, the present invention relates to a primer composition for a fluororesin coating comprising a dispersion in organic solvent of a polyether sulfone, polyamideimide and/or polyimide, a fluororesin, and a metal powder.

The present invention also relates to a process for adhering a thermoplastic film to a metal surface comprising applying to the metal surface a primer composition for a fluororesin coating, obtained by dispersing in an organic solvent a polyether sulfone, polyamideimide and/or a polyimide, a fluororesin, and a metal powder, sintering the primer on the resultant primer layer, and hot melting a thermoplastic fluororesin film.

The present invention provides a most optimum coating composition, as a primer for a rice cooker or chemical lining application which requires extensive corrosion resistance, and, as a primer to provide excellent corrosion resistance and adhesion for carrying out a powder coating of a fluororesin, for example, FEP and PFA.

As described above, the present invention uses a coating comprising the two binder components of a polyether sulfone and polyamideimide and/or a polyimide, plus FEP or PFA and a metal powder, thereby solving problems which have been of concern heretofore, such as food hygiene problems, problems of adhesion to the base surface, layer-to-layer adhesion, and corrosion resistance.

The primer composition for a fluororesin coating of this invention comprises a fluororesin as a component, preferably a perfluororesin of a readily-fusible, PFA, FEP, or a blend of these two. The use of these resins provides preferred results in terms of adhesion to the base metal material and interlayer adhesion to a topcoat in the form of a laminated thermoplastic fluororesin film. Heating PFA and FEP beyond their melting point resists pinhole formation because of their lower melt viscosity as compared to polytetrafluoroethylene (PTFE) and also facilitates flow into narrow sections when they are applied to a base material roughened by blasting, or the like, so as to facilitate adhesion, which is responsible for their use being preferred.

Effective binders for adhesion to metals are known to be polyamideimides, polyimides, polyether sulfones, polyphenyl sulfides, and the like. Frequently used base materials such as aluminum, steel, stainless steel, aluminum and stainless steel plated materials, and the like, in particular, steel and stainless steel, and the like, are more difficult to surface roughen compared to aluminum, therefore, they are more difficult to adhere. Among these binders, one which provides the most optimum adhesion to steel-type base materials is polyether sulfone. However, the use of a fluororesin primer with a polyether sulfone binder cannot be said to provide good interlayer adhesion, as discussed above.

The present inventors discovered that blending two binder types, a polyamideimide and/or a polyimide and a polyether sulfone provides increased coating strength, thereby generating a coated film which resists a cohesive failure.

The primer composition of this invention is designed to let the polyether sulfone migrate during sintering towards the base metal material side and to let the fluororesin migrate towards the top of the coated film, thereby performing its function as the coated film. If this separation progresses excessively, there is a danger of generating internal stresses in the coated film; if the film is subjected to conditions under which there is an external force, the possibility of crack formation between the polyether sulfone and the fluororesin arises; and these conditions could result in the delamination of the coated film. However, the primer composition of this invention further comprises a metal powder which hinders the separation of the polyether sulfone from the fluororesin so as to maintain the condition of mixing of the two, thereby making it difficult to allow separation; moreover, the metal powder itself relaxes internal stresses preventing any adhesive failure from occurring.

In addition, the primer composition of this invention further comprises a polyamideimide and/or a polyimide, and conceivably the polyamideimide, which is a curing resin, securely solidifies while the above ideal conditions are maintained. Therefore, the composition resists softening even at high temperatures, so as to provide good corrosion resistance at high temperatures. This results in the provision of a coated film which can satisfactorily withstand stress due to temperature changes, and the like.

The polyether sulfone to polyamideimide and/or polyimide ratio, when a good coated film in the composition of this invention is generated, is within the range of 95:5 to 55:45 by weight. (Parts, proportions and percentages herein are by weight except where indicated otherwise.) Having an excessive amount of polyether sulfone tends to accelerate cohesive failure of the primer, thereby decreasing interlayer adhesion with the top coat. An excessive amount of polyamideimide will provide poor resistance to corrosion, so that even if the top coat itself is corrosion-resistant, exposure to severe corrosive conditions or damage to the coated film will result unfavorably in the coated film's delamination from the base substrate due to the penetration of water vapor or a solution, or the like, into the primer.

The ratio by weight of the total of the two binders, polyether sulfone and polyamideimide, in the composition of this invention to the fluororesin is 20:80 to 70:30. Excessive use of the fluororesin results in decreased adhesion to the base substrate while an insufficient amount of the fluororesin results in less fusion with the top coat, with a resultant decrease in interlayer adhesion.

The polyether sulfone which is component A for the composition of this invention comprises one represented by the following structural formula:

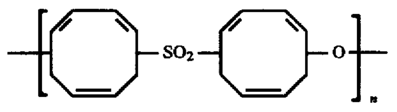

The polyamideimide and or polyimide as components for the composition of this invention are specifically, for example those derived from trimellitic anhydride and methylene dianiline trimellitic anhydride and oxydianiline, or trimellitic anhydride and metaphenylene diamine, or minobismaleimide, being used singularly or in any mixture thereof. Particularly preferred components for the composition of this invention, from among these polyamideimides and/or polyimides, are those derived from trimellitic anhydride and methylene dianiline.

The metal powder, a component of the composition of this invention, is of a flaky form. Any metal type can be used, but it is necessary to use a metal powder which is problem-free in terms of toxicity to humans for use in fabricating articles which come in contact with food, such as a rice cooker and cooking utensils. The addition of aluminum metal powder can be expected to improve thermal conductivity; in addition to the thermal conductivity aspect, it is necessary to be concerned with a type of metal which resists corrosion by way of an electro-corrosion reaction if the base material is, for example, steel: i.e., using an aluminum powder can prevent such corrosion. Corrosion takes place by transferring electrical charge when a base substrate is corroded, so that adding a metal to the primer which is electrically less noble (a higher ionization tendency than Fe) can prevent the steel base material from corroding, which particularly favors the use of such a metal. The proportion of aluminum which best generates such a favorable coating is 2–10% by weight.

From the standpoint of the cosmetics of the surface coating, the type Of metal powder and its shape should be selected accordingly. The metal powder is used based on the weight of the solids of the composition—in the range of 1–15%, preferably 2–10%.

The composition of this invention is optionally mixed with additives such as a viscosity regulator, a stabilizer, a colorant, and a dispersant.

The organic solvents which can be used include N-methyl pyrroidone by itself, preferably mixed systems of N-methyl pyrroidone with diacetone alcohol or xylene, and the like.

The composition of this invention is prepared by mixing the above components at the desired ratios and dispersing in a dispersing medium. The compositional ratio is adjusted so that the weight ratio of the total of the polyether sulfone and polyamideimide and/or polyimide: the fluororesin is 20:80 to 70:30.

The primer composition for a fluororesin coating prepared in this manner is applied to a metal surface by any coating method. The coatings method includes a variety of types, such as spray coating, spin coating, brush-coating, and the like.

The primer coated film thickness is preferably 5–15 microns in terms of the thickness after sintering.

The primer-coated metal surface is then dried. The drying is normally carried out at temperatures from ambient temperature to about 200° C., thereby generating a primer-coated layer on the metal surface after removal of any of the dispersion medium or other volatile matter from the primer composition for use in fluororesin coating.

The present invention is carried out by applying to above primer-coated layer a hot melt adhered fluororesin film on the sintered primer-coated layer, thereby coating the metal with the fluororesin.

The fluororesin films used herein can be those prepared from FEP, PFA, or a blend of FEP and PFA.

The invention comprises drying the primer layer applied to the metal surface, sintering beyond the temperature of the primer's melting point, mounting on top of the primer-coated layer a fluororesin film, and hot melt adhering, thereby generating an extremely secure adhered fluororesin coated layer onto he metal surface.

Sintering is carried out by the usual devices and methods for 10–40 minutes at temperatures of 350°–400° C.

The present invention is now specifically described by the following examples.

EXAMPLE

Example 1

An aluminum, alloy-plated steel sheet was surface-degreased with acetone and spray coated to cover the surface of the steel plate with a primer obtained by dispersing a composition comprising PES:PAI at a ratio of 4:1 and the ratio of PES+PAI:FEP of 1:2, with an aluminum platelet content of 4% in a dispersion medium comprising N-methyl pyrrolidone and diacetone alcohol and adding a pigment thereto. The coated thickness was adjusted so as to reach a post-dry thickness of about 8 microns. The sample was dried for 15 minutes at 150° C. followed by sintering in a sintering oven securely for 15 minutes at 350° C.

The FEP used had a composition of 85:15 by weight of tetrafluoroethylene/hexafluoropropylene.

PES was a VICTREX manufactured by the ICI Company.

PAI was a RHODEFTAL manufactured by Rhode Poulenc or a polyamideimide made by Phelps Dodge.

After sintering the primer a 25 micron thick PFA film was mounted on the primer followed by hot melt adhesion of this film at 350° C. under pressure of 5 kg/cm.

The PFA used in this operation was a copolymer of 97:3 by weight of tetrafluoroethylene/perfluorovinyl ether. The PFA film was securely adhered to the primer and the primer to the metal surface.

An evaluation of the adhesion strength of the adhered product with respect to temperature changes was taken. The sample was held at 100°, 150°, 200°, and 250° C. respectively, for 25, 50, or 100 hours, followed by carrying out a cross Erichsen test with 5 mm wide cuts to evaluate the adhesion strength.

Example 2

Example 1 was repeated except for using an aluminum sheet.

Example 3

Example 1 was repeated except for using a stainless steel sheet.

Control 1

Example 2 was repeated except for eliminating PAI from the fluororesin primer.

Control 2

Example 2 was repeated except for removing the PES from the fluororesin primer.

Control 3

Example 3 was repeated except for eliminating PAI from the fluororesin primer.

Control 4

Example 3 was repeated except for removing the PES from the fluororesin primer.

Control 5

An aluminum alloy-plated steel sheet was shot-blasted followed by adhering PFA film by the intermediary of a heat resistant silane coupling agent.

Control 6

An aluminum alloy-plated steel sheet was coated with a highly heat-resistant silicone adhesive followed by adhering the PFA film.

Control 7

An aluminum sheet was shot-blasted followed by hot melt adhering a PFA film. Coatings obtained from these examples were subjected to an adhesion strength test with a change in temperature to provide the results given in Table 1.

TABLE 1

| | Examples | | | Controls | | | | | | |
|---|---|---|---|---|---|---|---|---|---|---|
| °C., Hrs. | 1 | 2 | 3 | 1 | 2 | 3 | 4 | 5 | 6 | 7 |
| 100° C., 25 | ◇ | ◇ | ◇ | ◇ | ◇ | ◇ | ◇ | ◇ | ○ | ○ |
| 100° C., 50 | ◇ | ◇ | ◇ | ◇ | ◇ | ◇ | ◇ | ◇ | ○ | ○ |
| 100° C., 100 | ◇ | ◇ | ◇ | ◇ | ◇ | ◇ | ◇ | ◇ | ○ | ○ |
| 150° C., 25 | ◇ | ◇ | ◇ | ◇ | ◇ | ◇ | ◇ | ◇ | Δ | ○ |
| 150° C., 50 | ◇ | ◇ | ◇ | ◇ | ◇ | ◇ | ◇ | ◇ | Δ | ○ |
| 150° C., 100 | ◇ | ◇ | ◇ | ◇ | ◇ | ◇ | ◇ | ◇ | Δ | ○ |
| 200° C., 25 | ◇ | ◇ | ◇ | ◇ | Δ | ◇ | Δ | ○ | X | X |
| 200° C., 50 | ◇ | ◇ | ◇ | ◇ | Δ | ◇ | Δ | ○ | X | X |
| 200° C., 100 | ◇ | ◇ | ◇ | ○ | X | ○ | X | Δ | X | X |
| 250° C., 25 | ◇ | ◇ | ◇ | X | X | X | X | X | X | X |
| 250° C., 50 | ◇ | ◇ | ◇ | X | X | X | X | X | X | X |
| 250° C., 100 | ◇ | ◇ | ◇ | X | X | X | X | X | X | X |

In the Table:
◇ = Excellent;
○ = Good;
Δ = Fair;
X = Poor.

As described above, a blend of polyether sulfone with a polyamideimide gives a very strong interlayer adhesion and also provides excellent heat-resistant adhesion when exposed to high temperatures. This effect cannot be obtained if either PES or PAI is missing. The present invention is expected to find a broad range of applications for covering metal sheet with a fluororesin film.

What is claimed is:

1. A process for adhering a thermoplastic fluororesin film to a metal surface comprising applying to the metal surface a primer composition comprising a solution or a dispersion in an organic solvent of (a) a polyether sulfone, (b) a fluorinated resin, (c) at least one polymer selected from the group consisting of a polyamideimide, and a polyimide, and (d) a particulate aluminum metal or alloy, in which the proportion of the polyether sulfone to one or both of polyamideimide and polyimide is from 55:45 to 95:5 by weight and the ratio of the total polyether sulfone and one or both of polyamideimide and polyimide to the fluororesin is 20:80 to 70:30 by weight, and in which the particulate aluminum metal or alloy is in the form of flake and is present in an amount of 1–15% based on the solids of the composition by weight and applying onto said layer a thermoplastic fluororesin film by hot melt adhesion.

2. A process of claim 1 in which the fluororesin comprises at least one resin selected from the group consisting of tetrafluoroethylene/hexafluoropropylene copolymer, and tetrafluoroethylene/perfluoroalkyl vinyl ether copolymer.

* * * * *